United States Patent Office 3,586,571
Patented June 22, 1971

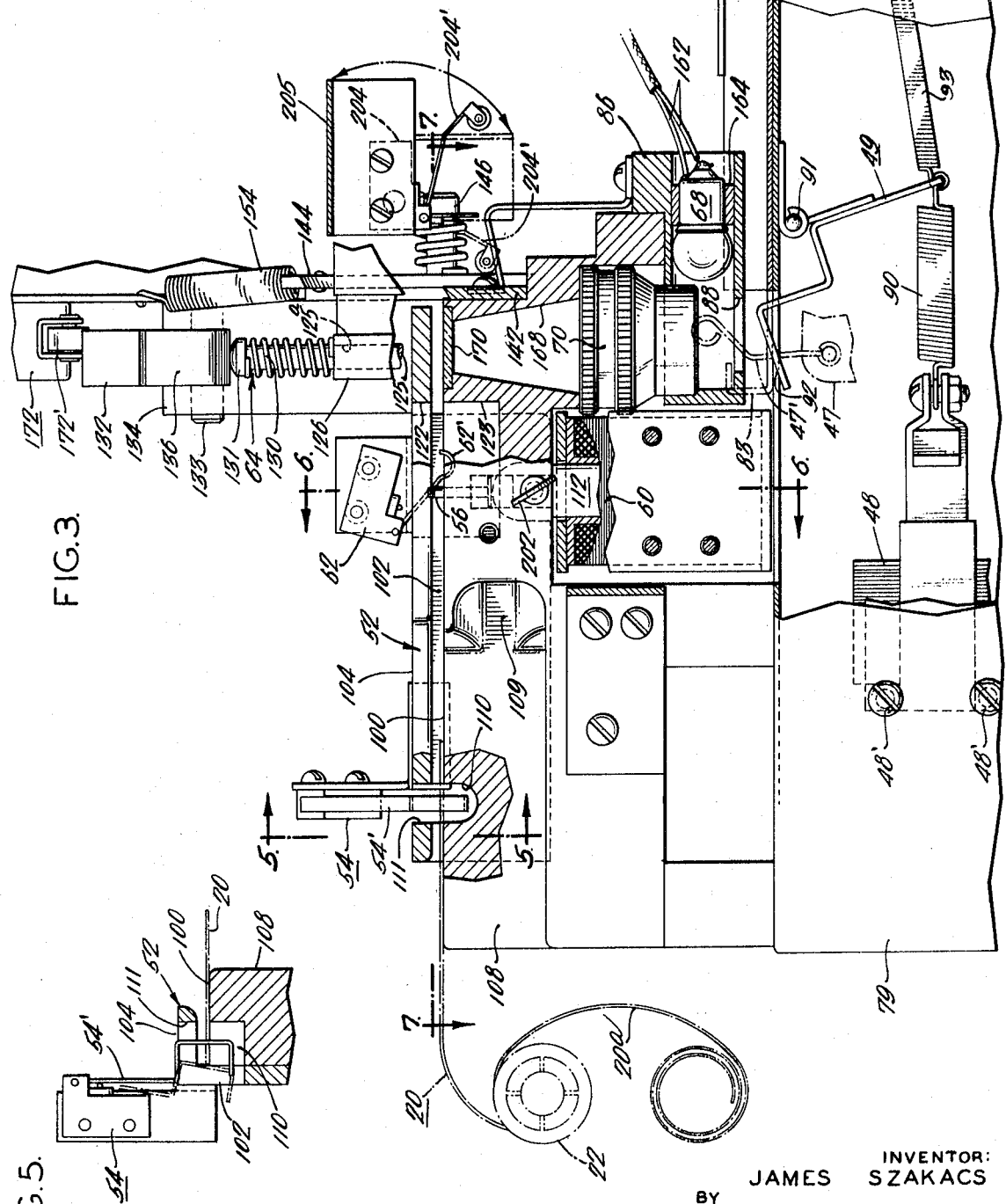

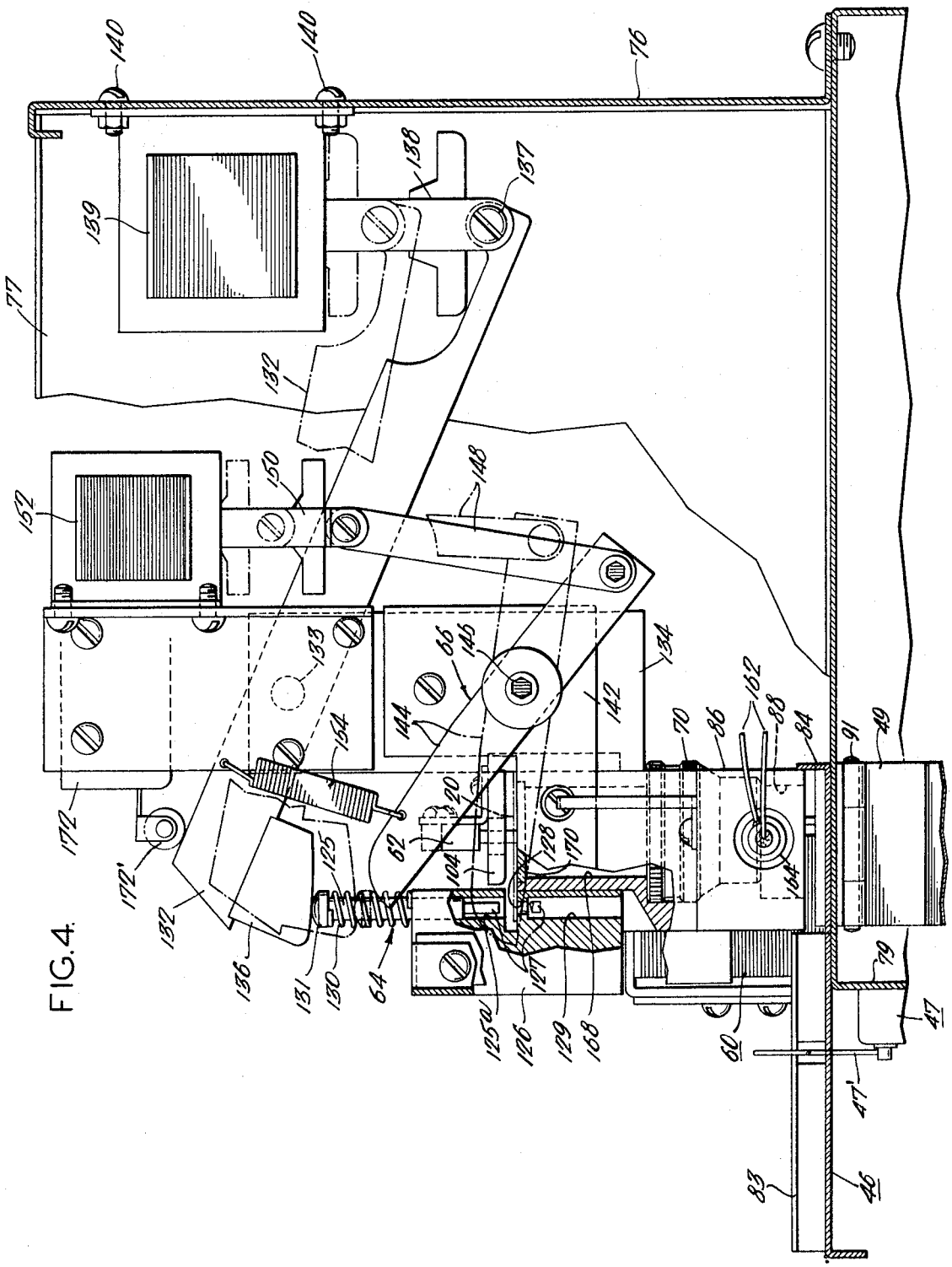

3,586,571
FILM PROCESSING APPARATUS
James Szakacs, 150 Pueblo Road,
New Britain, Pa. 18901
Filed Jan. 6, 1969, Ser. No. 789,123
Int. Cl. B32b 31/18
U.S. Cl. 156—353                               16 Claims

ABSTRACT OF THE DISCLOSURE

Apparatus for automatically photographing identifying indicia on the end of a roll of exposed undeveloped film while simultaneously trimming the film end and punching the film to permit the splicing together of a plurality of such films in proper registration to form a continuous roll of film for further processing.

---

The present invention relates generally to apparatus for processing exposed photographic roll film. In particular, the invention relates to apparatus for applying identifying indicia to the ends of lengths of roll film and for trimming and punching the film ends prior to further processing thereof.

The processing of exposed photographic roll film is to a large extent carried out in modern automated processing plants wherein the processing is accomplished by splicing the individual lengths of film together to form large reels of film which are then fed into automatic continuous developing and printing machines. Apparatus for splicing lengths of roll film end to end to form a reel of film is shown for example in my co-pending application Ser. No. 727,414, filed May 8, 1968.

Before the lengths of film can be presented for splicing to such a splicing machine, there are several so-called "pre-splicing" steps which are necessary. If the film is of the cartridge type, the cartridge must be broken or disassembled to remove the film under conditions of complete darkness. One end of the film must be trimmed to provide a proper registration with the existing holes. A further important step is the placement of some type of identifying indicia on each film so that the developed negatives and prints may be returned to the proper container upon completion of the processing steps for return to the photographer. Since all of these operations must be performed in total darkness, it can be understood that an apparatus which rapidly performs these steps automatically and accurately is invaluable to an efficient high speed film processing operation.

In the past, various types of jigs have been employed which require the manual positioning of a film into a device following which a switch such as a foot pedal is actuated to trim the film end. Various systems have been employed for identifying the film lengths and one which is in current use comprises the affixing to the film end of a pressure sensitive tape bearing an identifying number identical with the number on the film shipping container. Such labels, however, require time consuming manual application and are not infrequently susceptible to loosening especially during passage through processing solutions. Devices have in the past been constructed for photographing identifying indicia onto the film but these devices have been extremely complex and consequently expensive and have not been capable of the simultaneous automatic trimming and punching operations characteristic of the present invention.

In the present apparatus the film shipping container such as a bag is introduced into a suitable positioning means whereupon means are engaged upon the positioning of identifying indicia on the container to clamp the bag securely into position against the aperture of a light box. The end of an exposed undeveloped roll of film is then inserted into a film guide means until it reaches a predetermined position at which point means are automatically actuated to secure the film in the predetermined position. Upon the actuation of the film securing means, simultaneously a lamp in the light box is lit for a period controlled by a timer, and punching and cutting means are actuated to punch a sprocket hole and trim the film end. When the timer times out, the lamp is turned off and the film is released for removal.

Alternate forms of operation of the device are possible, for example, the trimming device may be employed without use of the identifier device and vice versa. Alternately, means are provided for gauging the point at which the identifying indicia is photographed and the film punched and trimmed either from the end of the inserted film or from the first sprocket hole of the film thereby permitting use of the device either with 35 mm. roll film or with the popular "Instamatic" 126 film.

In view of the above it can be understood to be a first object of the invention to provide an apparatus for automatically applying identifying indicia to the end of an undeveloped length of roll film by photographing the indicia from the film shipping container directly onto the film end.

A further object of the invention is to provide an apparatus as described wherein upon insertion of the container and the film end, the photographing operation is automatically effected in a predetermined location on the film end.

An additional object of the invention is to provide an apparatus as described wherein the film end is automatically trimmed at a predetermined point at the same time that the identifying indicia is photographed.

Still another object of the invention is to provide an apparatus as described wherein the position of the photographed indicia on the film and the point at which the film is trimmed is determined with respect to the location of the sprocket holes in the film.

A still further object of the invention is to provide an apparatus as described wherein an additional sprocket hole is punched in the film at the same time that the film is photographed and trimmed, which additional sprocket hole is properly registered with respect to the existing sprocket holes in the film and the trimming accurately controlled to prepare the film end for splicing.

Another object of the invention is to provide an apparatus as described which may alternately be operated to position the photographed indicia and the punch and trimming points with respect either to the end of the film length or with respect to the sprocket holes therein.

Still another object of the invention is to provide an apparatus as described wherein either the photographing or the trimming step may be selectively omitted.

Additional objects and advantages of the invention will be more readily apparent from the following detailed description of an embodiment thereof when taken together with the accompanying drawings in which:

FIG. 3 is an enlarged partial front elevational view of the apparatus shown in FIGS. 1 and 2 with portions thereof removed, broken away or shown in section to more fully reveal the components of the apparatus.

FIG. 4 is an enlarged sectional view taken along line 4—4 of FIG. 1 with portions thereof broken away to show interior details;

FIG. 5 is a partial sectional view taken along line 5—5 of FIG. 3 showing details of the film sensing micro-switch;

Figure 8:
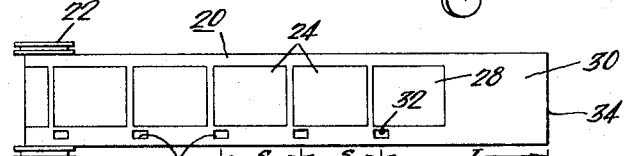
FIG. 8 is a view showing a partially unrolled length of Instamatic 126 film prior to processing in the present apparatus.

As generally indicated above, the present apparatus is intended for use under conditions of total darkness to prepare exposed, undeveloped roll film for splicing onto large reels for development and printing. Although it will be apparent that the apparatus can be used with roll films of different sizes, for purposes of illustration the apparatus will be initially described as utilized with the currently popular "Instamatic" 126 film. Referring to FIG. 8, a length of film 20 of this type is shown partially unrolled from a spool 22 following removal from the film cartridge (not shown) which maintains the exposed film in light-tight security during delivery to the film processor. The processor breaks the plastic cartridge to remove the spooled film, the breakage and removal being carried out in total darkness.

The film 20 as removed from the cartridge is characterized by a series of closely spaced exposed frames 24 which bear a fixed relation to film sprocket holes 26 along one edge of the film. As shown in FIG. 8, the sprocket holes are spaced a uniform distance S but following the last exposure 28 on the roll there are no sprocket holes in the unexposed end portion 30 of the film. The distance from the last sprocket hole 32 to the film end 34 is designated as distance L which is substantially larger than the distance S between sprocket hole centers. Prior to development of the film, the exposed frames 24 would not of course be visible nor could the film be placed under a light for examination without ruining the exposed frames. The views of FIGS. 8, 9 and 10 are thus schematic in this sense and are presented to provide a more complete understanding of the functions of the present apparatus.

Figure 9:
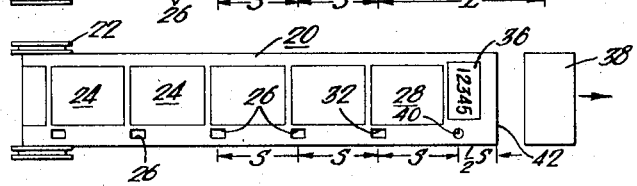
FIG. 9 is a view similar to FIG. 8 showing the film end following processing in the present apparatus.
Figure 10:
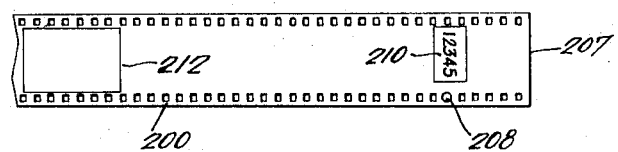
FIG. 10 is a view showing the end of a length of 35 mm. film following processing in the present apparatus.

In FIG. 9, the film of FIG. 8 is shown following processing by the present apparatus. Identifying indicia 36 have been photographed onto the film end 30 closely adjacent the last exposed frame 28, the indicia in this instance being the serial number of the shipping container, normally a bag, in which the film cartridge was shipped from the neighborhood pickup point to the processing plant. The film end 30 has been trimmed accurately to remove an end portion 38, and a punching operation has added an additional sprocket hole 40 in registration with the original sprocket holes 26. As illustrated, the film end is trimmed to provide a new film end 42 which is exactly one-half the distance S from the new sprocket hole 40. The precise registration of the new sprocket hole and the point of cutting of the film is to permit the splicing of successive film lengths into a single length having properly registered sprocket holes to permit passage of the spliced film around the sprocket wheels of continuous automatic film processing equipment. The other end of the film is similarly cut in the splicing apparatus such as disclosed in my above identified co-pending application to provide a trailing film end having a length of one-half the distance S from the preceeding sprocket hole to which the end 42 of a film length is spliced.

Figure 11:
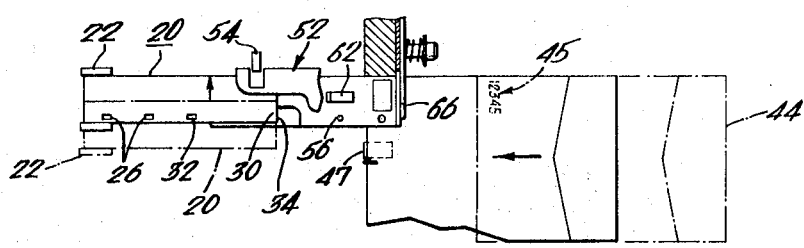
FIG. 11 is a schematic plan view of the apparatus showing the manner of insertion of the film container and the film end.
Figure 12:
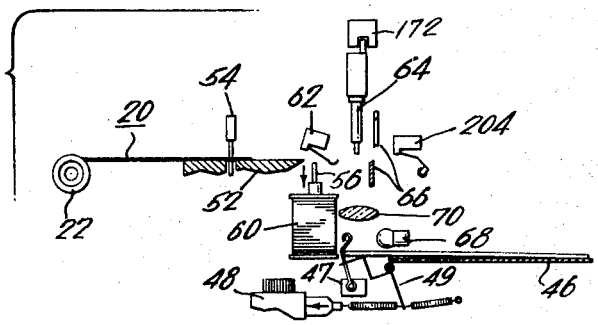
FIG. 12 is a front elevational schematic view of the apparatus with the film and container in the positions shown in FIG. 11.
Figure 13:
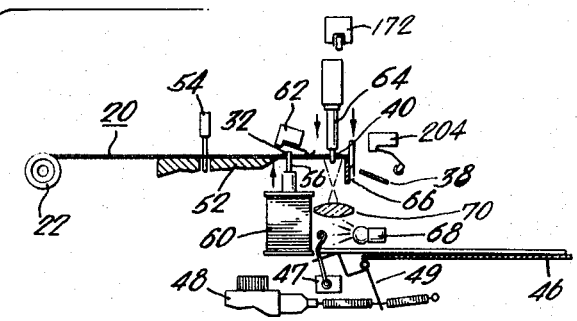
FIG. 13 is a view similar to FIG. 12 with the film in the predetermined processing position.

The manner in which the three functions of the apparatus, the photographing of the indicia, the trimming of the film end and the punching of the sprocket hole are simultaneously effected can initially be understood by reference to the schematic views of FIGS. 11–13. The film shipping container, in this instance a bag 44 having identifying indicia 45 on one corner thereof is advanced into the apparatus on support tray 46 until it engages a limit switch 47 thereby actuating a solenoid 48 connected with a container clamping lever 49. The clamping lever serves to secure the container against a light box with the identifying indicia 45 in registration with an aperture of said light box.

As shown in FIGS. 11 and 12, the film end 30 is advanced along a film guide means 52, the initial entry thereof closing the film sensing micro-switch 54 to cycle the automatic components and to initially retract the film step pin 56 by actuating solenoid 60. The stop pin 56 is properly positioned on the guide means 52 to align with the film sprocket holes 26 upon advancement of the film along the guide means. As the film end edge 34 passes over the stop pin 56, it engages the micro-switch 62 which de-energizes solenoid 60 permitting the stop pin 56 to be spring biased against the underside of the film. When the first sprocket hole 32 passes voer the stop pin, the pin moves upwardly into the sprocket hole, locking the film in position and causing a punch 64 to descend through the film thereby punching the sprocket hole 40 in registration with the sprocket holes 26. At the same time, the film cutter 66 is actuated to cut off the end portion 38 of the film and a lamp 68 is turned on to transmit an image of the identifying indicia from the container through a lens 70 onto the film end adjacent the new sprocket hole 40. When the lamp 68 has burned for a predetermined time, a timer releases the film cutter and the film punch, turning off the lamp and retracting the stop pin to permit removal of the processed film from the apparatus. On removal of the film from the guide means, the film sensing micro-switch 54 is opened permitting the apparatus to recycle for processing of the next film.

Figure 2:
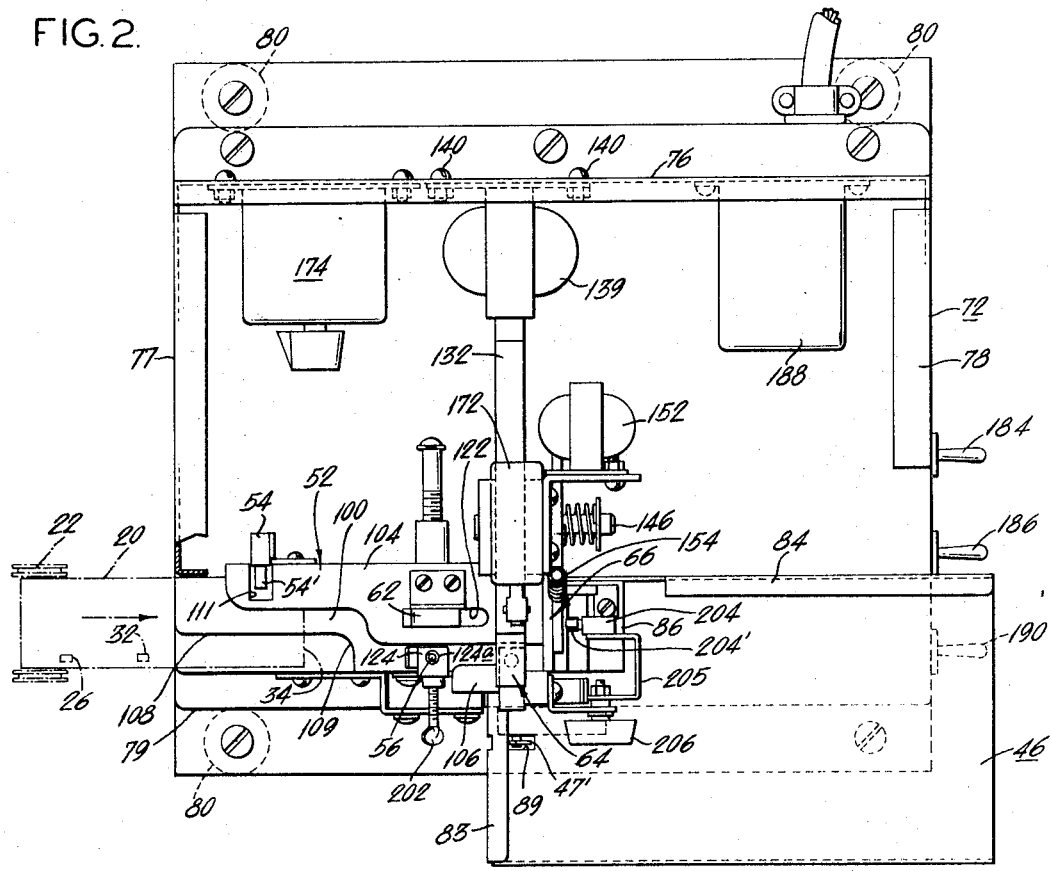
FIG. 2 is a plan view of the apparatus shown in FIG. 1.
Figure 1:
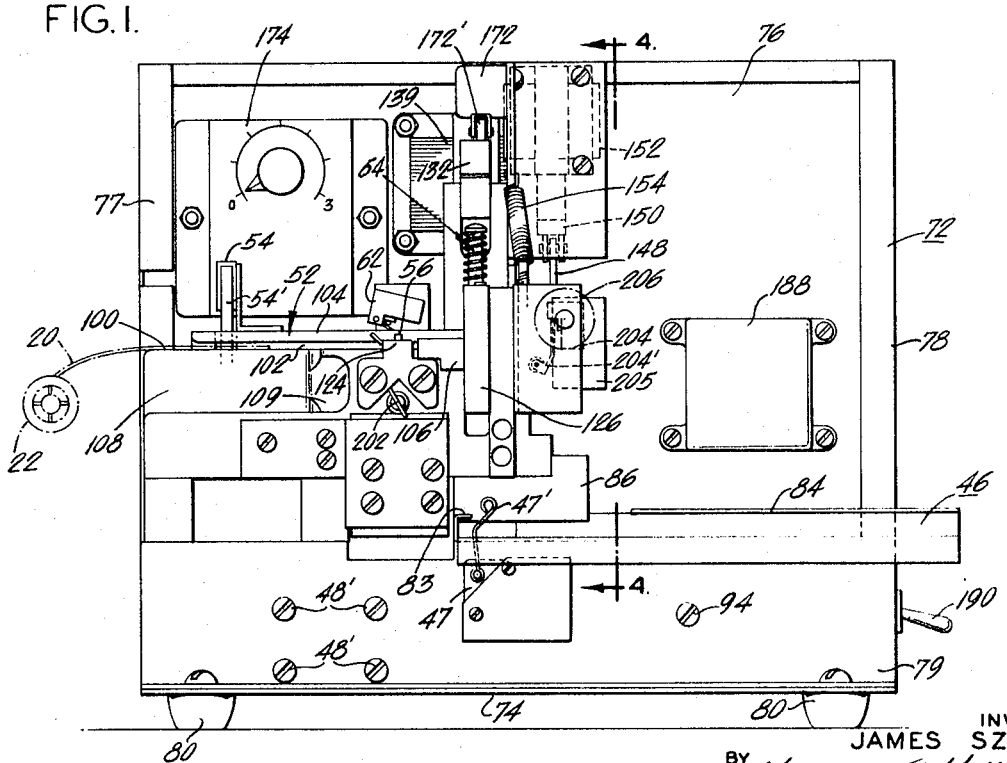
FIG. 1 is a front elevational view of an apparatus embodying the present invention with the front and top cover panels removed to reveal the internal mechanism thereof, the end of a length of roll film being shown in broken lines in the initial stage of insertion into the apparatus.

With the foregoing general description of the operation of the device in mind, the specific embodiment of the apparatus may be more readily understood and particularly by reference to FIGS. 1–4 of the drawings. As shown in FIGS. 1 and 2, the apparatus is disposed in a housing generally designated 72 including a floor panel 74, rear panel 76, side panels 77 and 78 and a lower front panel 79. The upper front panel and the top panel have been removed to reveal the details of the interior of the apparatus. Suitable resilient feet 80 are secured to the bottom panel to prevent movement of the apparatus during operation thereof.

Guide means in the form of a support tray 46 is provided extending outwardly from the front and the side of the housing to receive and guide the film container 44 such as a bag into a predetermined position. The tray 46 includes side and rear flanged container guides 83 and 84 to assist in accurately placing the container in the correct position in the apparatus under conditions of total darkness. Extending over one corner of the tray 46 in closely spaced relation to the tray is a light box 86 having an aperture 88 in the bottom thereof which is positioned directly above the identifying indicia 45 on the container when the container is seated against the side and rear guides 83 and 84. When moved into this position, the container edge trips the arm 47' of micro-switch 47 which extends upwardly through a slot 89 in the tray as shown in FIG. 2. The closing of the switch 47 energizes the solenoid 48 secured to the front panel 79 by screws 48' which by means of spring linkage 90 rotates the M-shaped clamping element 49 about the pivot point 91 to spring bias the container between the bottom of the light box 86 and the clamping face 92 of the clamp element.

A return spring 93 connects the lower end of the clamping element 49 with bolt 94 passing through the front panel of the housing and serves to retract the clamping lever upon deenergization of the solenoid.

Figure 7:
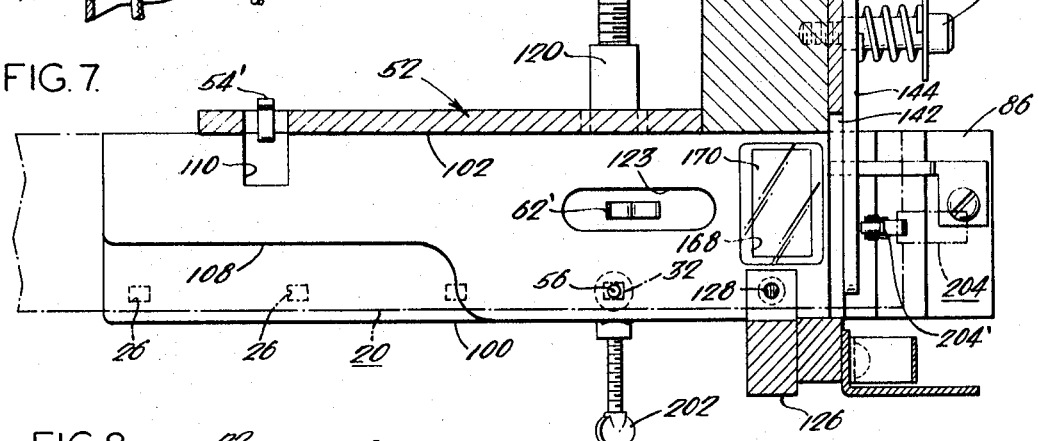
FIG. 7 is a sectional view taken along line 7—7 of FIG. 3.

The film guide means 52 comprises a horizontal support surface or table 100 secured to the housing in spaced parallel relation above and to the left of the container guide means. The film guide means includes a rear guide wall 102 as shown in FIG. 7 and an overlying guide plate 104 to prevent the curling of the film. To hold the film edge against the rear wall 102, a guide block 106 is provided adjacent the front edge of the table 100 as shown in FIGS. 1 and 2. The table 100 is cut away at 108 to provide a finger guide for the operator to assist in properly placing the film in the film guide means in the dark. The cut away portion 108 terminates in an outwardly curving slot 109 which further serves to orient the operator in presenting the film to the apparatus.

Upon introduction of the film 20 onto the film table 100, the operator moves the film along the table with the back edge of the film against the rear wall 102 and in doing so trips the limit switch 54 by displacement of the limit switch arm 54' as shown in FIG. 5. The limit switch arm 54' in the absence of the film swings across the table 100 through the slot 110 therein and the aligned slot 111 in the overlying guide plate 104. The actuation of the switch 54 as indicated above cycles the apparatus circuit for film processing as will be described more fully herebelow, initially effecting the downward movement of stop pin 56 extending upwardly through the table 100 by energization of the stop pin solenoid 60 fixedly mounted to a housing support.

Figure 6:
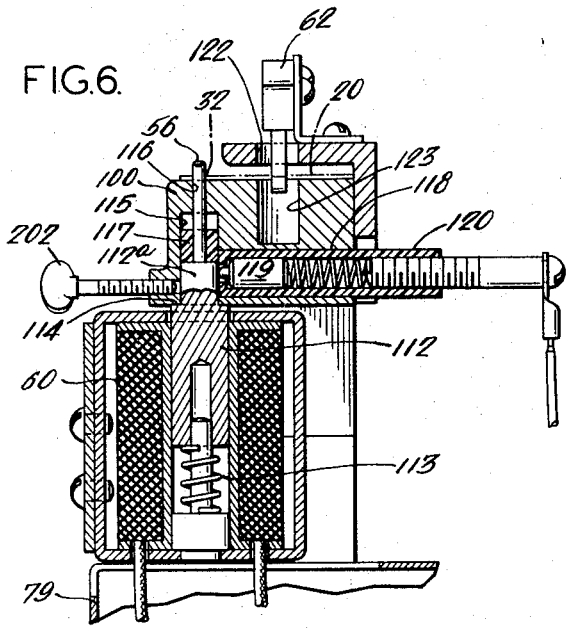
FIG. 6 is a sectional view taken along line 6—6 of FIG. 3 showing details of the film stop pin assembly.

The specific arrangement of the stop pin assembly is shown in the sectional view of FIG. 6 wherein the stop pin 56 is seen to extend from the solenoid plunger 112 which is spring biased upwardly by the spring 113. The upper portion 112a of the plunger cylinder 112 is of a reduced diameter forming a shoulder 114 which buts against the bottom of the table 100 in the raised position of the stop pin. The upper portion 112a slides within a bore 115 of the table with the stop pin 56 extending through a substantially smaller bore 116 thereof. The lower end of the pin 56 is surrounded by a Teflon insulating bushing 117 for a purpose which will shortly become apparent.

A lateral intersecting bore 118 in the table 100 opens into the bore 115 and contains a spring loaded electrical contact element 119 which is slidable within an insulating bushing 120 in the bore 118. In the raised position of the stop pin shown in FIG. 6, the contact element 119 bears against the portion 112a of the solenoid plunger and closes an electrical circuit which is described in detail hereinafter. When the stop pin is lowered upon energization of the solenoid 60, the contact element 119 bears against the insulating bushing 117 thereby breaking the circuit. It is by means of this mechanism that upon the location of the sprocket hole 32 by the stop pin, an electrical circuit is energized to initiate the photographing, punching and film cut off operations.

With the film end placed on the film guide means and closing the limit switch 54 to retract the stop pin 56, the film is advanced to the right along the table surface over the retracted stop pin, and the advancing film edge 34 engages the arm 62' of limit switch 62 which as shown in FIGS. 3, 6 and 7 depends downwardly through slot 122 in the overlying plate 104 and slot 123 in the table 100. The closing of the switch 62 by the advancing film edge deenergizes the solenoid 60 and permits the stop pin to be upwardly biased by the spring 113 against the bottom of the film. As shown in FIGS. 1 and 2, a shoe 124 overlying the table 100 above the stop pin holds the film against the table surface during passage over the spring biased pin. (The shoe 124 has been omitted from the views of FIGS. 3, 4 and 6 to avoid confusion.) The pin passes upwardly through a bore 124a in the shoe upon alignment of the pin with the first sprocket hole 32 in the film edge thereby actuating the film processing mechanism described in detail hereinafter.

The film punch generally designated 64 comprises a cylindrical punch element 125 which is vertically slidable in bore 125a of the upstanding frame element 126 affixed to the housing. The punch tip 127 is adapted to pass through the film into a bore 128 in the frame element beneath the film edge. The punch film slug drops through an enlarged bore 129 in the frame portion 126 into a suitable container (not shown) for disposal. A coil spring 130 in compression around the upper end of the punch element bears against the top of the frame 126 and against the punch cap 131 on the upper end of the punch element thereby urging the punch element into the raised position.

The punch element is downwardly actuated by a punch actuating arm 132 which is pivotally mounted at 133 on an upstanding frame member 134. The front end of the actuating arm 132 includes a punch contact block 136, the lower surface of which engages the rounded surface of the punch cap 131. The inner end of the punch actuating arm 132 is pivotally connected at 137 to the plunger 138 of solenoid 139 which is secured to the back panel 76 of the housing by bolts 140. Upon actuation of the solenoid 139, plunger 138 is moved upwardly thereby pivoting the arm 132 to move the punch element 125 downwardly and punch the additional sprocket hole 40 in the film. Upon release of the solenoid 139, the force of the spring 130 lifts the plunger element and actuating arm into the raised position.

The film cutter generally designated 66 comprises a stationary cutter blade 142 affixed to the right hand end of the table 100 as most readily seen in FIG. 3. A movable cutter blade 144 pivoted to the upstanding frame member 134 at 146 is rotatable into shearing relation with the fixed blade 142 to effect a trimming of the film end. The inner end of the movable cutter 144 is connected by link 148 to the plunger 150 of solenoid 152 mounted on the upstanding frame member 134. When the solenoid 152 is energized, the plunger 150 is moved upwardly thereby rotating the movable cutter element 144 into the broken line position shown in FIG. 4 and effecting a cut off of the film end 38. Suitable collecting means (not shown) may be provided adjacent the fixed cutter element to collect the discarded film ends. A spring 154 extending between the front end of the movable cutter element and the upstanding frame member 134 serves to return the cutter element to its raised position upon release of the solenoid 152.

The details of the light box 86 and the manner in which the identifying indicia is photographed onto the film edge is shown most clearly in FIG. 3. Within the light box 86 and laterally spaced with respect to the aperture 88 in the bottom thereof is the lamp 68 having the electrical leads 162 soldered directly thereto. A light tight insulating bushing 164 prevents the escape of light into the room in which the processing of the undeveloped films is taking place. Upon illumination of the identifying indicia by the bulb 68, the image thereof is transmitted by the lens assembly 70 upwardly through a tapered bore 168 in the table 100 onto the film end positioned thereabove. A window 170 in the bore 168 flush with the surface of table 100 prevents the film edge from catching in the aperture and also prevents dust from entering the lens assembly.

The bulb 68 is controlled by a limit switch 172 mounted at the upper end of the upstanding frame member 134 and having a roller switch arm 172' which bears against the front upper edge of the punch actuating arm. Upon actuation of the punch, the switch arm drops, closing the switch to light the lamp. When the punch is released, the arm is raised, turning off the lamp. The duration of the exposure is controlled by a timer 174 shown in FIGS. 1 and 2 which may be adjusted for example for an exposure of between zero and three seconds depending upon the sensitivity of the film being processed. When the timer times out, the solenoids 139 and 152 are simultaneously deenergized and the solenoid 60 is energized thus releasing the punch element and turning off the lamp, and retracting the stop pin to permit withdrawal of the film. Upon withdrawal of the film from the table 100 the film sensing switch 54 opens thereby recycling the apparatus as will be presently described.

Figure 14:
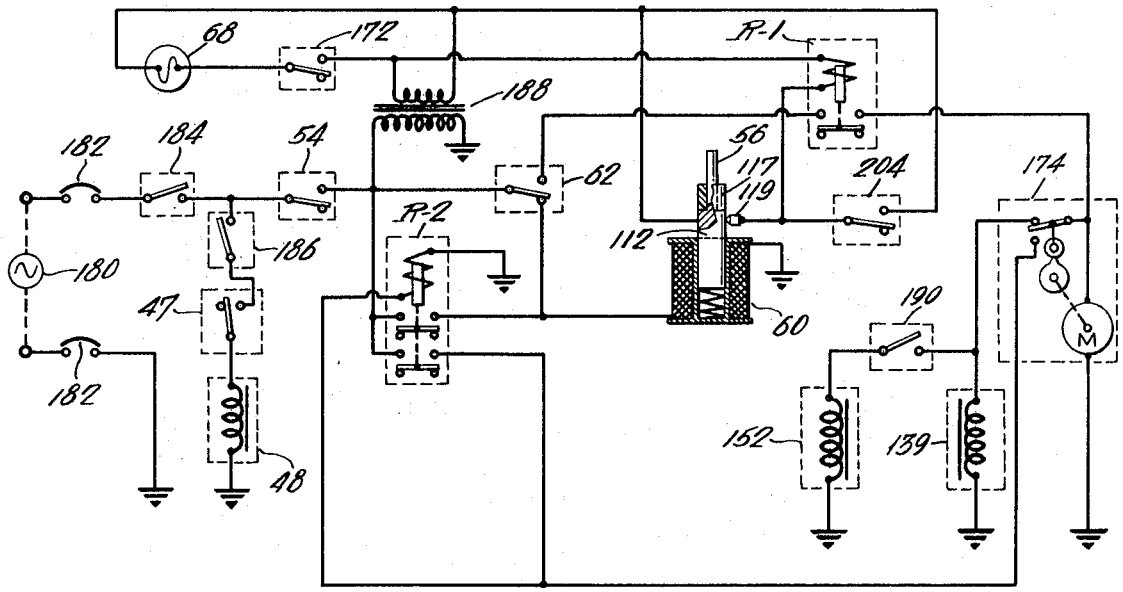
FIG. 14 is a schematic wiring diagram of the apparatus.

Referring to FIG. 14, the electrical wiring diagram for the apparatus is schematically illustrated. The 110-volt A.C. power source 180 is connected through a suitable protective device such as a circuit breaker 182 to a main power switch 184. The container clamping solenoid 48 is connected to the power source by the manually operated container clamp switch 186 and the micro-switch 47 coupled thereto in series. The main power switch 184 and the container clamp switch 186 are in the illustrated embodiment conveniently located on the side panel 78. When these two switches are closed, the container clamping mechanism is operable independently of the remainder of the circuit to be described and the placement of a container in the proper position on the plate 82 against switch arm 47' will cause the container to be clamped in place by energizing the clamping solenoid 48.

Also connected to the main power switch is the normally open film sensing micro-switch 54 which is closed when a film is disposed on the table 100. Connected to the switch 54 are a transformed 188, the cutter solenoid 152, the punch solenoid 139 and the stop pin solenoid 60 and associated circuitry. The transformer is energized whenever the switch 54 is closed thereby providing power for the low voltage circuit which includes in parallel the lamp 68 actuated by limit switch 172 upon lowering of the punch arm 132, and the relay R-1 which is closed when the stop pin is in the raised position. The stop pin solenoid is energized to retract the stop pin by operation of the micro-switch 62 until the film end engages the switch arm 62' thereby switching the contact to connect with the relay R-1 which is closed when the stop pin engages a film sprocket hole thus raising the insulating bushing 117 and permitting the contact 119 to engage the conductive plunger 112. With the relay R-1 closed, the timer 174 is actuated and for a timed period permits current flow to energize the punch and cutter solenoids 139 and 152. The energization of the punch solenoid by actuating the punch arm 132 closes the limit switch 172 to complete the lamp circuit. A manual switch 190 in series with cutter solenoid 152 permits the shut off of the cutter if this phase of the operation is to be omitted. The switch 190 is in the preferred embodiment located adjacent the switches 184 and 186 on the side panel 78.

When the timer times out, the punch and cutter solenoids are deenergized (causing switch 172 to open turning off the lamp) and the double contact relay R-2 is energized to actuate the stop pin solenoid by direct connection with switch 54 until the film is withdrawn from the table 100 opening switch 54. Since the relay R-1 will open as soon as the stop pin is retracted thus breaking the circuit through the timer to the coil of relay R-2, a holding circuit is provided by the lower contact arm of the relay R-2 to keep the relay R-2 closed until switch 54 is opened.

Upon removal of the film from the table 100 thereby opening the switch 54, the relay R-2 will open and the timer will have reset thus recycling the apparatus for the next film length.

The operation of the apparatus has been generally described above along with the description of the apparatus structure and the electrical circuit. In summary, with the apparatus located in a dark room, the timer 174 is set to the desired exposure time, the power line is connected to a source of electrical power, and the switches 184, 186 and 190 are set in the ON position. The operator takes a film container usually a bag, and removes the exposed film cartridge therefrom, placing the container with the identifying indicia facing upwardly on the support tray 46 and moving it against the guides 83 and 84 to trigger the switch 47 and actuate the clamping solenoid 48. The container is then securely held by clamp element 49 against the underside of the light box 86 with the identifying indicia 45, normally a serial number, beneath the aperture 88.

The spool film is then removed from the cartridge and partially unrolled as shown in FIG. 3, the film 20 being separated from its paper backer 20a and advanced emulsion side down into the film guide means 52. With Instamatic 126 film the sprocket holes 26 are then located along the forward edge of the film. The operator holds the film against the rear wall 102 as the film end is advanced to close and hold closed the limit switch 54 thus energizing the stop pin solenoid 60 and retracting the stop pin 56 below the surface of the table 100. When the film end 34 trips switch 62, the stop pin solenoid 60 is released, allowing the stop pin to rise under spring pressure when the first sprocket hole 32 passes thereover. The entry of the stop pin into the film sprocket hole locks the film in position and closes the relay R-1 permitting current to flow through timer 174 to the punch and cutter solenoids 139 and 152, bringing down the cutter blade 66 and the punch actuating arm 132 to punch and trim the film. The punch arm 132 moves the punch element tip 127 down through the bore 128 to cleanly punch the sprocket hole 40, as the cutter blade 66 shears across the fixed blade 142 to trim the film to the desired edge 42'. As the punch arm 132 moves downwardly, the switch 172 is closed, lighting the lamp 68 to illuminate the identifying indicia on the container and permit an image of the indicia to be focused by the lens assembly 70 through the window 170 onto the film end adjacent the last exposed frame.

When the timer times out, the punch and cutter solenoids are deenergized, permitting the springs 130 and 154 to respectively return the punch element and actuating arm and the cutter blade to their normal raised positions. The return of the punch actuating arm opens the switch 172 to turn off the lamp. As the timer times out, the relay R-2 is actuated to energize and hold the stop pin solenoid, lowering the stop pin and permitting the removal of the film. When the film clears the switch 54, the relay R-2 and the timer are reset and the apparatus is ready for the next film. The container is pulled to the right to open the switch 47, releasing the clamp solenoid 48 and permitting removal of the container.

Although the apparatus is principally intended for use in the combined punching, cutting and photographing operations, it is of course possible to omit either the cutting or the photographing step. The cutting step may be omitted simply by opening the switch 190. Omission of the cutting step would permit development of the film by the so-called "dip and dunk" method wherein the film end is gripped by a clip. When the photographing step is not employed, the switch 186 is opened and the lamp 68 may be disconnected.

For use of the apparatus with 35-mm. film lengths such as the film 200 shown in FIG. 10, the stop pin 56 is held in the retracted position by thumb screw 202 which is tightened against the portion 112a of the plunger 112. Because of the presence of continuous closely spaced sprocket holes on the entire length of 35-mm. film, the stop pin could not be utilized to indicate a predetermined position of the film end on the table 100. Instead, a film end detector switch 204 is mounted on the pivotal housing bracket 205 (FIG. 2) with the switch arm 204' thereof depending downwardly. When the switch 204 and bracket 205 are rotated by knob 206 into the operative position shown in FIGS. 1 and 2 and in broken lines in FIG. 3, the edge 207 of the 35-mm. film upon passing over the right hand edge of the table 100 trips the switch arm 204'. As shown in the wiring diagram of FIG. 14, the closing of switch 204 has the same effect as the rising of the stop pin, namely the actuation of relay R-1 to energize the timer and the cutter and punch solenoid. In the absence of the stop pin, the film is secured in position during the cutting and photographing operations by the punch element which punches a hole 208 in the film as shown in FIG. 10. The hole 208 need not be in register with the existing sprocket holes and the punching of the hole serves only to secure the film in position for the other operations.

As was the case with the 126 film, the 35-mm. film may be trimmed without photographing identifying indicia on it, or it may be exposed to the image of the identifying indicia without being trimmed as was the case with the film shown in FIG. 10.

Since 35-mm. film lengths are normally rewound into their cartridge, the end first unwound in processing is the leader which has been exposed to light in loading the camera. Therefore the film must be completely unspooled for use in the present apparatus and the inner unexposed end advanced into the film guide. The indicia 210 exposed thereon will then be substantially spaced from the last exposed frame 212 as shown in FIG. 10.

When the apparatus is used with 126 film, the switch 204 is rotated by bracket knob 206 into the raised position shown in FIG. 3 at which position the switch arm 204' will not be reachable by the film ends.

From the foregoing it can be understood that the present invention provides an apparatus for rapidly and accurately punching, trimming and photographing identifying indicia on the end of a length of photographic film thereby preparing the film end for a splicing operation preparatory to further processing. The apparatus as described may optionally be operated to omit either the photographing or the timing operations. The apparatus illustrated is adapted for use with either 126 Instamatic or 35-mm. film and could readily be adapted for film of other sizes.

Manifestly, changes in details of construction can be effected by those skilled in the art without departing from the spirit and the scope of the invention as defined in and limited solely by the appended claims.

I claim:

1. Apparatus for punching, trimming and photographically applying identifying indicia onto the end of an exposed undeveloped roll of photographic film having sprocket holes therein comprising, film guide means for receiving and supporting a film end, means for detecting a predetermined position of said film on said film guide means, means for positioning means bearing identifying indicia in a predetermined relation to said predetermined film position, means for transmitting an image of said identifying indicia onto said film end, means for punching a sprocket hole in said film in alignment with the existing film sprocket holes, and means for trimming the end of said film, said position detecting means providing a simultaneous actuation of said punching means, film trimming means, and image transmitting means to thereby simultaneously punch the sprocket hole in the film, trim the film end and photographically apply identifying indicia to said film end.

2. Apparatus as claimed in claim 1 wherein said means for positioning means bearing identifying indicia comprises means for receiving and holding a film container bearing identifying indicia in spaced parallel relation to said predetermined position of said film.

3. Apparatus for punching, trimming and photographically applying identifying indicia onto the end of an exposed undeveloped roll of photographic film having sprocket holes therein comprising, film guide means including a film supporting table for receiving and supporting a film end advanced therealong, means for detecting a predetermined position of said film on said film guide means, means for receiving a film container having identifying indicia thereon, said container receiving means including means for holding said container in a predetermined position relative to the predetermined position of said film end, means including a lens assembly and means for illuminating said identifying indicia for transmitting an image of said indicia onto said film end, punch means for punching a sprocket hole in said film in alignment with the existing film sprocket holes, film cutting means for trimming the film end, and means for simultaneously actuating said punch means, cutting means and said illuminating means when said film end and container are in their respective predetermined positions.

4. The apparatus as claimed in claim 3 wherein said film cutting means is adapted to trim said film end at a predetermined distance from the sprocket hole punched by said punch means.

5. The apparatus as claimed in claim 4 wherein the sprocket hole punched by said punch means is spaced a distance from the adjacent sprocket hole equal to the spacing of the existing film sprocket holes, and wherein said predetermined distance of the trimmed film edge from the punched sprocket hole is equal to one-half of the distance between sprocekt holes.

6. The apparatus as claimed in claim 3 including timing means for automatically resetting said punch means and said cutting means and for discontinuing actuation of said illuminating means after a preselected time interval.

7. The apparatus as claimed in claim 3 wherein said punch means includes a punch element which extends through and holds said film end in the predetermined position upon actuation of said punch means.

8. The apparatus as claimed in claim 3 wherein said detecting means includes a spring loaded stop pin on said guide means, means for automatically retracting said stop pin upon initial entry of said film end into said film guide means, and means for automatically releasing said stop pin following passage of the film end thereover, said stop pin being aligned with the sprocket holes of said film and being adapted to enter the first sprocket hole passing thereover to stop said film in the predetermined position.

9. The apparatus as claimed in claim 3 wherein said detecting means includes a limit switch positioned proximate said film guide means, contact of the advanced film end edge tripping said limit switch to signal the predetermined position of said film end.

10. Apparatus for punching, trimming and photographically applying identifying indicia onto the end of an exposed undeveloped roll of photographic film having sprocket holes therein comprising, film guide means including a film supporting table for receiving and supporting a film end advanced longitudinally therealong, stop means for stopping a film in a predetermined position on said table, said stop means comprising a spring-loaded stop pin on said table adapted to engage the first film sprocket hole passing thereover, punch means on said table adapted to punch a sprocket hole in said film end in registration with said existing film sprocket holes, cutting means for trimming said film end at a predetermined distance from said punched sprocket hole, means for positioning a film container having identifying indicia thereon in a predetermined spaced parallel position relative to said predtermined film position, a lamp for illuminating the identifying indicia of said container, a lens assembly for transmitting an image of the illuminated identifying indicia onto said film end, and timing means actuated by the engagement of said stop pin with a film sprocket hole for simultaneously actuating said punch means and cutter means and lighting said lamp for a preselected time interval.

11. Apparatus as claimed in claim 10, including a light box containing said lamp, an aperture in said light box, and means for automatically clamping said container against said light box with the identifying indicia thereof aligned with the aperture of said light box.

12. Apparatus as claimed in claim 10, including means for automatically retracting said stop pin upon initial entry of said film end into said film guide means, and means for automatically releasing said stop pin following passage of the film end thereover.

13. Apparatus as claimed in claim 10, including means for selectively locking said stop pin in a retracted position, and a limit switch selectively positionable proximate said table for contact by the advancing film edge to signal the predetermined position of said film.

14. Apparatus as claimed in claim 13 wherein said punch means includes a punch element which extends through and holds said film end in the predetemined position upon actuation of said punch means.

15. Apparatus as claimed in claim 10 wherein said predetermined distance of the trimmed film edge from the punched sprocket hole is equal to one half of the distance between sprocket holes.

16. Apparatus as claimed in claim 10 including means permitting selective deactuation of said cutting means.

References Cited

UNITED STATES PATENTS

| | | | |
|---|---|---|---|
| 3,069,570 | 12/1962 | Abadie | 242—57.0 |
| 3,484,323 | 12/1969 | Chrastil et al. | 156—513 |

FOREIGN PATENTS

| | | | |
|---|---|---|---|
| 271,182 | 5/1913 | Germany | 156—505 |

BENJAMIN A. BORCHELT, Primary Examiner

D. A. BENT, Assistant Examiner

U.S. Cl. X.R.

156—502, 545, 262